United States Patent [19]

Farnsworth et al.

[11] Patent Number: 4,739,462

[45] Date of Patent: Apr. 19, 1988

[54] POWER SUPPLY WITH NOISE IMMUNE CURRENT SENSING

[75] Inventors: Robert P. Farnsworth; Steve Mishima, both of Los Angeles, Calif.

[73] Assignee: Hughes Aircraft Company, Los Angeles, Calif.

[21] Appl. No.: 686,338

[22] Filed: Dec. 26, 1984

[51] Int. Cl.[4] .............................................. H02M 3/335
[52] U.S. Cl. ........................................ 363/21; 363/56; 363/90
[58] Field of Search ...................... 363/18, 19, 20, 21, 363/55, 56, 90

[56] References Cited

U.S. PATENT DOCUMENTS

| | | | |
|---|---|---|---|
| 3,562,623 | 2/1971 | Farnsworth | 363/20 |
| 4,150,425 | 4/1979 | Nagano et al. | 363/97 |
| 4,335,423 | 6/1982 | Koizumi et al. | 363/21 |
| 4,541,041 | 9/1985 | Park et al. | 363/98 |

Primary Examiner—R. Skudy
Assistant Examiner—Anita M. Ault
Attorney, Agent, or Firm—Lewis B. Sternfels; A. W. Karambelas

[57] ABSTRACT

A power supply (20) incorporates a switching regulator circuit and a flyback transformer (26) having diodes (42) for unidirectional current flow from an output circuit of the transformer to a load (24). Substantially noise-free sensing of currents in both input (32) and output (34) windings of the transformer is provided by a sensing circuit composed of a sense winding (46) on the transformer and an integrator (50) coupled to the sense winding. The integrator provides an output signal proportional to volt seconds or flux which, in turn, is proportional to either the input current or the output current. The input current and the output current flow alternately due to a switching action of the regulator circuitry. The regulator circuitry includes an electronic switch (38) coupled via a comparator to an output terminal of the integrator so as to initiate a pulse of current in the input winding when the output currents drop below a preset value, and to terminate the input current when the input current exceeds a preset value. A bank of capacitors (54) connected to the input winding (32) stores electric energy in the intervals between pulses for subsequent discharge into the transformer during the current pulses. The foregoing arrangement of the power supply circuitry provides for isolation of input and output sections of the power supply to prevent the coupling of noise. An overvoltage sensing circuit may also be coupled to the output winding (34) for acting via a logic unit to terminate input current during intervals of excessively high output voltage.

16 Claims, 3 Drawing Sheets

POWER SUPPLY WITH NOISE IMMUNE CURRENT SENSING

BACKGROUND OF THE INVENTION

This invention relates to current sensing in electric power supplies and, more particularly, to a flyback switching regulator wherein winding currents are monitored by a sensing of volt-seconds or flux, such monitoring being substantially free of noise associated with the operation of switching type regulators.

Many forms of power supplies have been constructed for applying power to different types of electrical loads. When regulation is required, the power supply includes a regulator circuit which senses an output current and/or voltage with control of current and/or voltage being provided, typically, by some form of feedback. One large class of regulated power supplies is the flyback switching regulator. In its usual construction, a flyback switching regulator includes input and output sections coupled by a transformer, and further comprises some form of pulsing circuit which causes pulsations of current to flow in the input section. The duration and the spacing of the input current pulses are controlled by the regulator circuit to provide a desired output voltage or current.

Some electrical loads require a regulated high voltage from a storage capacitor or pulse forming network (PFN). An important example of such load is an optically pumped laser, wherein the laser is excited by lamps which are driven by large current pulses supplied from pulse forming networks. A switching regulator power supply incorporating a flyback transformer circuit is ideally suited for providing charging current pulses to the pulse forming network. In the flyback type of power supply, current pulses appear alternately in the input and the output sections of the supply, an output current pulse being provided by the energy of an input current pulse transferred by magnetic flux of the transformer to provide the output current pulse.

A problem arises in switching regulator and flyback power supplies in that noise is produced by the switching of large current pulses (sometimes measuring in the hundreds of amperes) and is coupled into the regulator circuit by feedback signal lines from the sensors of input and output, current and voltage. In the case of lasers used in range-finding systems, such noise is coupled from the input section of the power supply to other circuitry, particularly receiver circuitry which is sensitive to noise. This results in a degradation of system performance. The noise can also degrade the performance of the regulator circuit of the power supply. Attempts to reduce the effects of the noise on the regulator circuit by filtering signals and by relocating electrical components have often not had adequate success.

SUMMARY OF THE INVENTION

The foregoing problems are largely overcome and other advantages are provided by a switching regulator power supply incorporating circuitry for sensing currents in both input and output windings of the transformer for precise regulation of current pulses used for charging capacitive loads or pulse forming networks. It is an advantage of the invention to accomplish the current sensing and regulation in a manner which is substantially immune to noise produced by switching of current pulses and to provide decreased noise currents affecting associated equipment.

This object is attained in accordance with the invention by constructing the transformer with a sense winding. The sense winding is coupled to an integrator. The sense winding enables a sensing of voltage induced by changes in magnetic flux and, upon integration of the voltage, provides a volt-seconds signal which is proportional to the flux in the transformer core. Use of the sense winding and the integrator eliminates the need for current and voltage sensors in the output section of the supply, as well as common return wiring from the sensors which tends to conduct noise to the input section. The magnetic flux is proportional to both the input and the output currents of the transformer. Since input and output currents appear alternately in a flyback supply, the volt-seconds sensing of the invention alternately provides signals proportional to the input and the output currents for accurate control of the regulation process. In addition, the integration process attenuates any noise spikes which may be present thus allowing more precise regulation of the switched current. The foregoing circuitry isolates the input and output sections of the power supply to block the noise from reaching the input section and other electrical circuitry which might be connected thereto.

The power supply further comprises a switching circuit in series with the input winding of the transformer, the switching circuit being operated in response to an output signal of the integrator. A bank of capacitors for the storage of electric energy connects the input terminal of the power supply to the input winding of the transformer to serve as a source of current pulses upon closure of the switching circuit. The bank of capacitors is recharged between input current pulses.

A sensor of output voltage may also be provided to turn off the regulator when the load voltage reaches a predetermined value or level. A logic unit is connected between the sensor and the switching circuit for deactivating the switching circuit during an interval 10 of full charge output voltage or when external charge inhibit is required. The logic unit also connects with the integrator for discharging a capacitor thereof during intervals of full charge voltage and charge inhibit.

BRIEF DESCRIPTION OF THE DRAWING

The foregoing aspects and other features of the invention are explained in the following description taken in connection with the accompanying drawing wherein.

DETAILED DESCRIPTION

Figure 1:
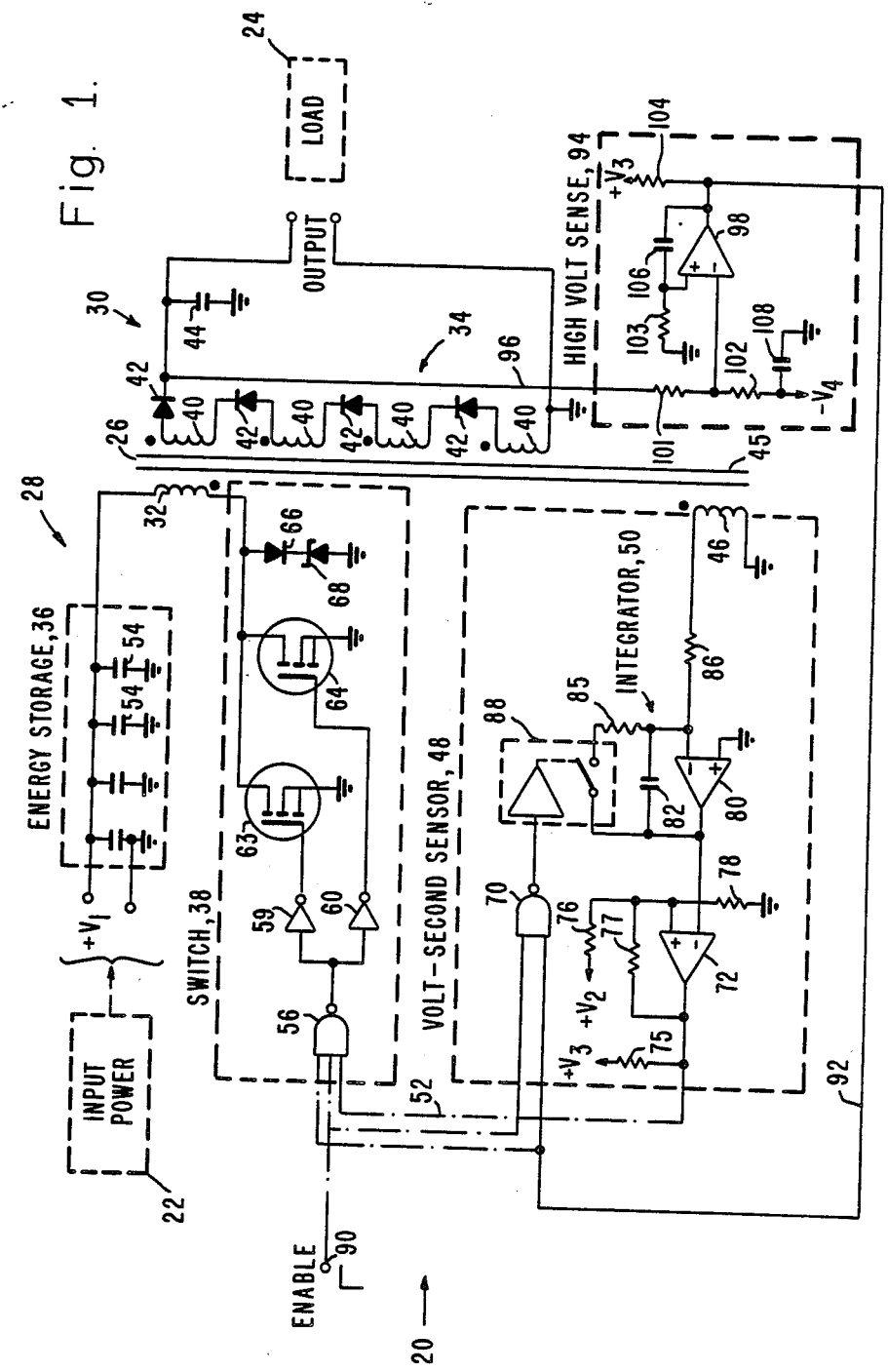
FIG. 1 shows an electrical schematic drawing of a power supply incorporating the invention.

An electrical schematic diagram of a power supply 20 incorporating the invention is shown in the FIG. 1. The supply 20 couples power from an unregulated source 22 of input power to a load 24 illustrated herein as a capacitive load or a pulse forming network. The supply 20 is constructed in the form of a switching regulator employing a flyback transformer 26 for regulating electric power applied to the load 24. The supply 20 comprises an input section 28 and an output section 30 which are coupled by the transformer 26. The transformer 26 includes an input winding 32 connecting with the input section 28 and an output winding 34 connecting with the output section 30. The output winding 34 comprises several windings 40. As is conventional, such individual windings are interconnected by diodes 42 to reduce the effective capacitance of the winding 34 for reasons presented in U.S. Pat. No. 3,562,623.

The input section 28 comprises an energy storage unit 36 and an electronic power switch 38 which are serially connected to the input winding 32. Input terminals of the storage unit 36 connect with the power source 22. The switch 38 provides a return current path between one terminal of the winding 32 and a grounded, current return terminal of the energy storage unit 36. Closure of the switch 38 permits current to flow from the storage unit 36 through the winding 32, the current in the winding 32 being terminated upon an opening of the switch 38. Repetitive operation of the switch 38 is employed for providing the switching regulator function of the supply 20 for practicing the invention. The output section 30 of the supply 20 is also constructed for implementing the switching regulator function.

The output winding 34 comprises a set of winding sections 40. The circuitry of the output section 30 comprises a set of diodes 42 which serially connect individual ones of the winding sections 40 between output terminals of the supply 20, the output terminals being connected to the load 24. Also included within the output circuitry is a capacitor 44 connected across the output terminals for smoothing pulses of current provided by the output section 30. The series of diodes 42 provide for unidirectional flow of current between the output winding 34 and the load 24.

The switching regulator and flyback operation of the power supply 20 is characterized by a series of input current pulses in the winding 32 and a series of output current pulses in the winding 34. The input and output current pulses occur alternately. The polarities of the windings 32 and 34 are indicated by dots shown adjacent the windings. Currents in the input winding 32 and the output winding 34 are magnetically coupled by a core 45 of the transformer 26. During the flow of a pulse of current in the winding 32, magnetic energy builds up in the form of magnetic flux in the core 45. Upon termination of the pulse of input current in the winding 32, the energy of the magnetic flux is converted to a pulse of output current in the winding 34, the pulse of output current beginning upon termination of the pulse of input current. This is in accordance with the well-known flyback operation of a switching regulator power supply.

In accordance with the invention, the transformer 26 further comprises a sense winding 46 magnetically coupled to the core 45, and the input section 28 further comprises a volt-second sensor 48, the latter including an integrator 50 connected to output terminals of the sense winding 46. The sense winding 46 produces an output voltage proportional to a rate of change of current in the input winding 32 and to a rate of change of current in the output winding 34. The voltage of the sense winding 46 is integrated by the integrator to provide a volt-second quantity proportional to flux in the core 45 as well as to the current associated with the flux, namely, either the input current of the winding 32 or the output current of the winding 34. Since the input and the output currents flow alternately, the sensor 48 can provide a measure of both the input current and output current of the windings 32 and 34, respectively. Upon attaining a desired magnitude of either of the currents in the windings 32 and 34, the sensor 48 provides a control signal along line 52 for operation of switch 38. The control signal on line 52 activates and deactivates the switch 38 for initiating and terminating each current pulse in a succession of pulses of input current to provide a desired control of the pulses of output current.

As has been noted hereinabove, the power supply 20 is particularly useful in applying current to a load such as a pulse forming network commonly used with an optically pumped laser, wherein the load requires very large current pulses of predetermined magnitude which are supplied by the pulse forming network. The flyback switching regulator provides a succession of pulses suitable for charging such a load, and the interconnection of the sensor 48 between the transformer 26 and the switch 38 in accordance with the invention provides for precise control of the current pulses applied to the load 24.

The energy storage unit 36 comprises a bank of capacitors 54 connected in parallel between one terminal of the input winding 32 and ground. The capacitors 54 are charged to a voltage V1 supplied by the power source 22. The stored energy in the capacitors 54 supplies the pulses of input current in the winding 32. With each pulse of the input current, there is a partial discharge of the capacitors 54, the capacitors 54 being recharged by the source 22 during intervals between the pulses of the input current in the winding 32. The storage unit 36 protects the power source 22 from the surges of current associated with the pulse operation of the input winding 32.

The power switch 38 comprises a NAND gate 56, digital inverters 59-60, two field-effect transistors 63-64, a diode 66 and a zener diode 68. The two transistors 63-64 are connected in parallel, the source terminals of the transistors 63-64 being connected to a terminal of the winding 32, and the drain terminals of the transistors 63-64 being connected to ground. The gate terminals of the transistors 63-64 are driven respectively by the inverters 59-60, the inverters 59-60 being driven, in turn, by the NAND gate 56. The diodes 66 and 68 are connected in series across the source-drain terminal pair of each of the transistors 63-64, with the directions of forward current flow of the diode 66 being opposite that of the diode 68 to protect the transistors 63-64 from excessive voltage swing upon a turn off of a pulse of the current in the winding 32. The NAND gate 56 receives three digital signals and, in response to concurrent logic-1 values of each of the three digital signals, provides an output logic-0 signal which is converted by the inverters 59-60 to a logic-1 signal at each of the gate terminals of the transistor 63-64. The logic-1 signals of the inverters 59-60 provide positive voltage across the gate-drain terminal pair of each of the transistors 63-64 for inducing flow of current from the winding 32 through the transistors 63-64. Upon termination of the logic-1 signals of the inverters 59-60, the transistors 63-64 assume states of nonconduction, and thereby act as switches for switching the current in the winding 32.

The sensor 48 comprises a NAND gate 70, an operational amplifier 72, and four resistors 75-78 connected to the amplifier 72. Also included within the sensor 48 is an aforementioned integrator 50 which comprises an operational amplifier 80, a capacitor 82, two resistors 85-86, and an electronic switch 88 operated by an output signal of the NAND gate 70.

In operation, the capacitor 82 is coupled between a negative input terminal of the amplifier 80 and the output terminal thereof to provide for the integration function of the integrator 50. The resistor 86 is connected between the negative input terminal of the amplifier 80 and a terminal of the sense winding 46 providing a time constant to the integration operation equal to the product of the capacitance of the capacitor 82 and the resistance of the resistor 86. The positive input terminal of the amplifier 80 is connected to the opposite terminal of the sense winding 46 through ground. The resistor 85 is serially connected with the switch 88 across the terminals of the capacitor 82 to serve as a discharge path for resetting the integrator 50 upon receipt of a logic-1, or high, voltage from the NAND gate 70.

The amplifier 72 is operated as a comparator with the resistor 77 connected as positive feedback between the positive input terminal of the amplifier 72 and the output terminal thereof. The resistors 76 and 78 are serially connected between a source of positive voltage V2 and ground to serve as a voltage divider circuit with the node between the resistors 76 and 78 also being connected to the positive input terminal of the amplifier 72. The output terminal of the amplifier 72 connects to the line 52 and is also connected by the resistor 75 to a source of positive voltage V3. The resistor 75 serves as a pull-up resistor for the line 52 to maintain a logic-1 voltage on the line 52 except when the voltage on line 52 is given a relatively low value, logic-0, by action of the amplifier 72.

The negative input terminal of the amplifier 72 is connected to the output terminal of the amplifier 80 of the integrator 50 for comparing the output voltage of the integrator 50 to a reference value or voltage established by the voltage divider circuit of the resistors 76, 77, and 78. The values of the resistors 76 and 78 are selected in accordance with a desired value of reference voltage to be applied to the positive input terminal of the amplifier 72.

The sensor 48 operates as follows to control the pulsing of current in the input winding 32. One input terminal of each of the gates 56 and 70 is coupled to a terminal 90 for receipt of a digital enable signal for electronic activation and deactivation of the power supply 20. Another input terminal of each of the gates 56 and 70 is coupled to a line 92 which normally has a logic-1, or high, voltage as will be explained hereinafter.

Upon activation of the power supply 20 by application of the enable signal, a logic-1 signal, to the terminal 90, the three input lines to the NAND gate 56 each have logic-1, or high, voltages resulting in activation of the switch 38 to initiate a pulse of current through the input winding 32. Upon initiation of the current in the winding 32, the current in the winding 32 induces a magnetic flux in the core 45 of the transformer 26, which flux links the sense winding 46. The magnitude of the flux is proportional to the current in the winding 32 and, as the current increases, the changing value of flux induces a voltage at the sense winding 46.

Integration of the voltage at the sense winding 46 produces a value at the output terminal of the integrator 50 which is proportional to the magnitude of the input current and to the magnitude of the flux. The current in the input winding 32 increases at a rate inversely proportional to the inductance appearing at the terminals of the winding 32 and proportional to the input voltage $V_1$. As the input current increases, the output voltage of the integrator 50 also increases until such time as the integrator voltage is equal in magnitude to that of the reference voltage at the amplifier 72. Thereupon, the comparator action of the amplifier 72 is triggered resulting in a logic-0 signal on line 52 which deactivates the switch 38 to terminate the flow of current in the winding 32. By means of the foregoing operation, the sensor 48 has initiated and terminated a pulse of input current in the winding 32, the current pulse being terminated when the input current has reached a predetermined value.

In accordance with the flyback operation of the transformer 26, upon termination of the input current which established the flux in the core 45, a current now appears in the output winding 34 having a magnitude dependent in the turns ratio between input and output windings of the transformer. It is noted that during the interval of time during which current flows in the input winding 32, no current flows in the output winding 34 due to the blocking of such current by the diodes 42. Upon termination of the input current, the induced current in the output winding 34 is in the forward direction of the diodes 42. The output current of the winding 34 flows into the load 24 and gradually decreases in magnitude as the load 24 extracts energy from the output current. As the output current decreases in magnitude, the flux in the core 45 also decreases in magnitude, producing a voltage across the sense winding 46 with the opposite polarity of that produced by the input current pulse. The output voltage of the integrator 50 begins to change, so as to follow the value of the output current. When the output current drops to a predetermined value, the comparator action of the amplifier 72 again applies a logic-1 signal to the line 52 to activate the switch 38 for initiating another pulse of input current. The foregoing procedure repeats cyclically so as to provide a desired amount of current to the load 24 in each pulse of output current of the power supply 20.

It is noted that, by way of an alternative embodiment of the sensor, the amplifier 72 may be replaced with a window comparator having different reference values for initiation and termination of the input current in the winding 32. As is well known, such a comparator circuit employs plural comparators joined by output logic circuitry permitting one reference value to be utilized in initiating the current flow and a second reference value to be utilized in terminating the current flow. In such a manner, the reference values can be set independently of each other. The circuit shown in FIG. 1 is preferred because it has been found to perform adequately and is simpler in construction.

Figure 2:
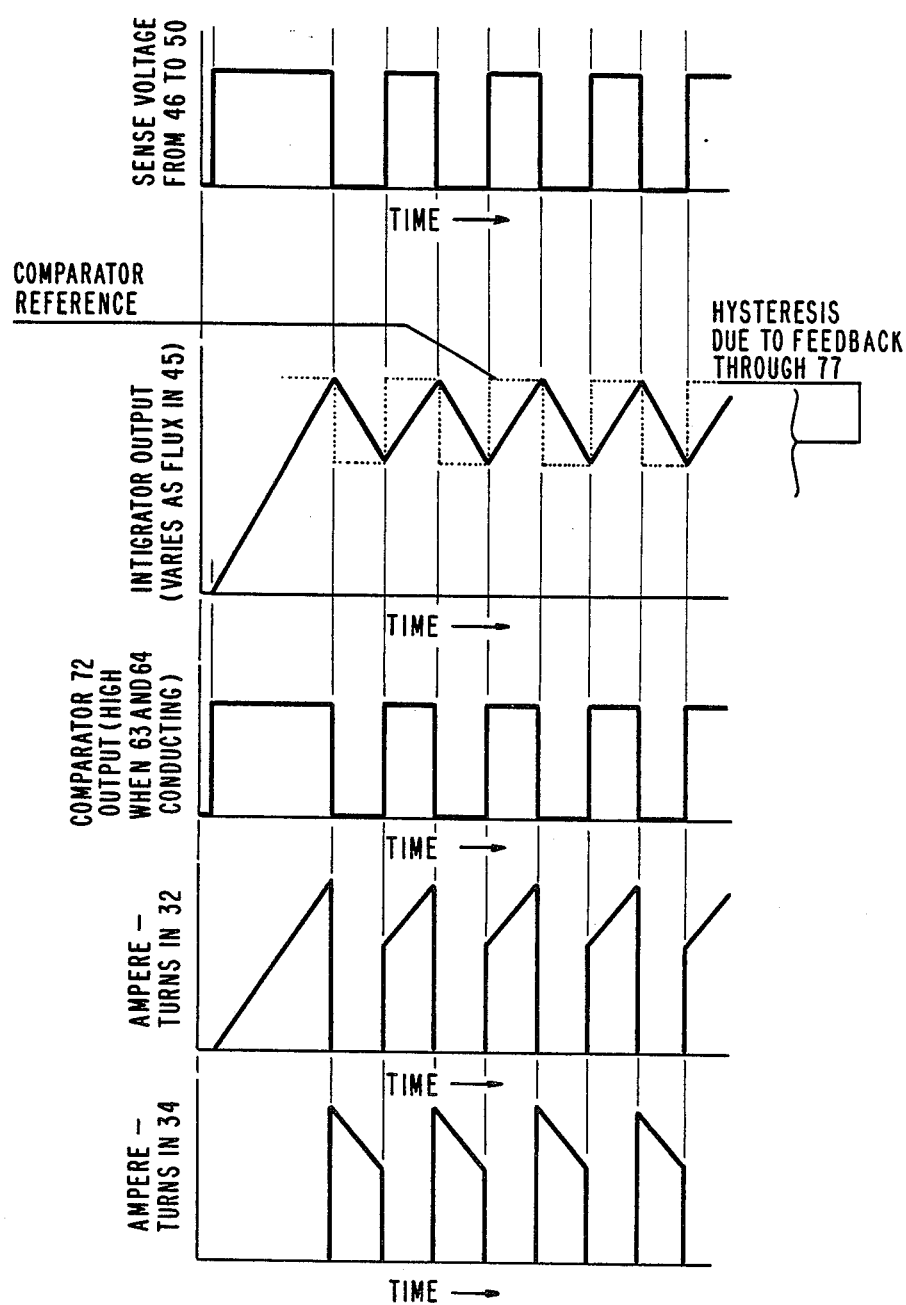
FIG. 2 shows a plurality of waveforms taken at various points in the current shown in FIG. 1.

With reference also to FIG. 2, the first graph shows the waveform of the sense voltage present on the connection between the sense winding 46 and the integrator 50. Correlated in time, the output of the integrator 50 is shown as the second waveform, with the reference to the comparator 72 shown superimposed on the integrator output. The comparator reference is the voltage at the junction of resistors 76, 77, and 78 and the +input to comparator 72.

The change in level of the reference voltage is referred to as the "hysteresis due to feedback through 77" in the figure. The logic level signal present on line 62 is fed back into the reference input of the comparator 72 through resistor 77. Resistors 75, 77, and 78 form a voltage divider that determines the magnitude of the hysteresis signal. The two states of the reference signal to the comparator represent the levels at which the signal out of the integrator will cause the FET switches 63 and 64 to change conduction states.

The shape of the integrator output signal is qualitatively the same as the sum of the ampere-turns in the input winding 32 and in the output winding 34. It is, therefore, readily seen that the operation of the integrator, comparator with hysteresis and control logic does control the currents in both the input and output circuits.

FIG. 1 also shows an optional high voltage sensor circuit 94 connected by a line 96 to an output terminal of the power supply 20, and outputting the aforementioned logic signal on line 92 to the gates 56 and 70. The purpose of the sensing circuit 94 is to monitor the output voltage of the supply 20, and to disable, or turn off the supply 20 when the lead 24, which in one embodiment is a pulse forming network, is fully charged. This action of the circuit 94 protects both the supply 20 and the load 24 from excessive voltage and also controls the pulse forming network voltage at which further changing is stopped.

The sensing circuit 94 comprises an operational amplifier 98, four resistors 101-104 and two capacitors 106 and 108. The output of supply 20 at load 24 is connected to the resistor 101 by the line 96. The resistor 102 is connected to a negative reference voltage V4. The resistors 101-102 are connected together at a common node with a negative input terminal of the amplifier 98 to serve as a voltage divider circuit for providing a sensing voltage to the amplifier 98. The capacitor 108 is a bypass capacitor between the V4 voltage terminal and ground. The capacitor 106 is serially connected with the resistor 103 between the output terminal of the amplifier 98 and ground, the junction between the capacitor 106 and the resistor 103 being connected to a positive input terminal of the amplifier 98. The resistor 104 is connected between the output terminal of the amplifier 98 and a source of positive voltage V3 to serve as a pull-up resistor for the line 92. The connection of the capacitor 106 between input and output terminals of the amplifier 98 provides for a regeneration function to the amplifier 98 to provide alternating current hysteresis.

During the pulse forming network process of the supply 20, the output signal of the amplifier 98 is held at a logic-1 value by operation of the pull-up resistor 104. The resistance values of the resistors 101 and 102 are selected to apply a small fraction of the output voltage of the supply 20 to the negative input terminal of the amplifier 98. The positive input terminal of the amplifier 98 is grounded by the resistor 103. The negative input terminal of the amplifier 98 is normally at a negative voltage but rises to ground as the output voltage from the supply 20 reaches the desired value. As the voltage at negative input terminal of the amplifier 98 rises above ground, the output voltage on line 92 assumes a value of logic-0 which both disables the power switch 38 and, by the gate 70, closes the switch 88 to reset the integrator 50. Upon reduction in the output voltage of the supply 20, the sensing circuit 94 permits the signal on line 92 to resume a value of logic-1 for resumption of the operation of the power supply 20.

The foregoing circuitry of the power supply 20 is advantageous in that the input section 28 and the output sections 30 are fully separated because there are no electric wires connecting these two sections, which wires would otherwise be capable of coupling noise pulses from the output section 30 to the input section 28. The only connection is by the magnetic coupling of the transformer 26. This feature in the construction of the supply 20 provides immunity with respect to any noise appearing in the output section 30. As a result, the circuitry of the input section 28 can function with greater precision in the regulation of the output current of the supply 20. The foregoing feature of the invention also serves to isolate the supply 22 from such noise and to isolate other circuitry (not shown) which might be coupled to the input power supply 22.

Further immunity to noise is provided by the filtering action of the integrator 50. Since the integrator 50 responds slowly to any noise spikes which might appear at the sense winding 46, the output signal of the integrator 50 as well as the signal on line 52 are thereby isolated substantially from any such noise. Accordingly, the invention has provided for the control of output current pulses while maintaining a substantially noise-free environment in the control circuitry.

With respect to the interconnection of the optional voltage sensing circuit 94 between the output section 30 and the input section 28, only small voltage signals appear at the negative input terminal of the amplifier 98 due to the voltage-divider action of the resistors 101-102. Thus, any noise which may be coupled back from the output section 30 to the input section 28 of the supply 20 by the line 92 is of a relatively small value. In the arrangement of the components of the supply 20, it may be possible to shield the line 92 from noise to prevent the coupling of noise between the output and input sections of the supply 20.

Figure 3:
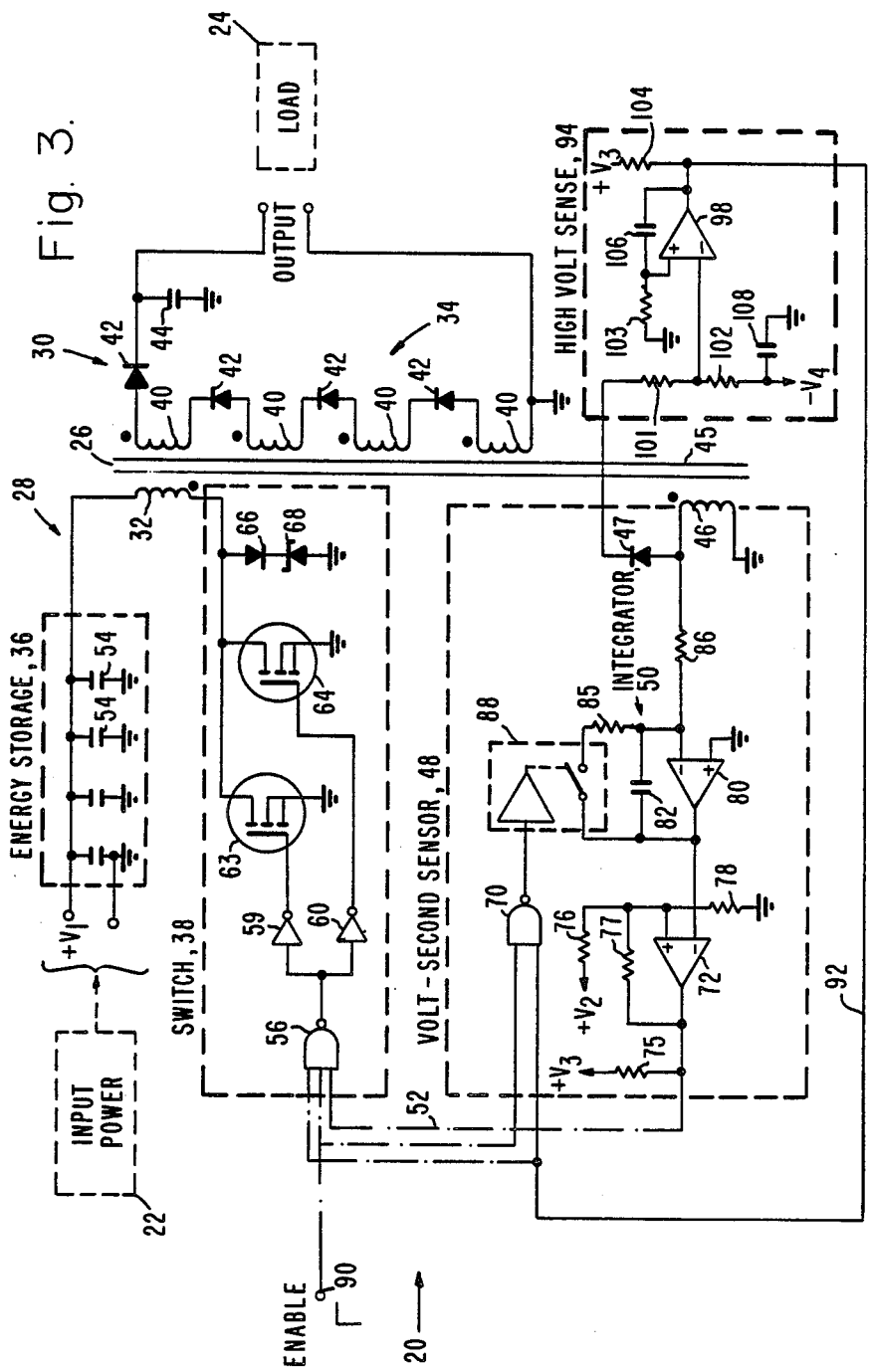
FIG. 3 depicts a modification of a portion of the circuit illustrated in FIG. 1.

In the event that the output current pulses of the supply 20 are of such a high value that excessive noise is coupled via the line 92, then, as shown in FIG. 3, the protection circuit 94 may be connected to the junction of resistor 86 and the sense winding 46 through a diode 47 to provide complete isolation of the voltage section or, optionally, some other form of coupling, such as electro-optic coupling (not shown) may be employed instead of the line 92 for coupling logic signals from the sensing circuit 94 to the input section 28 of the supply 20.

A further advantage provided by the foregoing circuitry is manifested by the relatively high input impedance of the integrator 50 which can operate on the voltage of the sense winding 46 with no more than a negligible amount of current drawn from the sense winding 46. As a result, the monitoring of the input and the output currents can be accomplished without sampling these currents directly, this arrangement of the invention resulting in substantially less dissipation of power than is associated with the insertion of current measuring resistors or other devices which would otherwise be required to be inserted into the circuits of the input and/or output windings of the transformer 26. It is also noted that the output voltage of the sense winding 46 may be relatively large, if desired, to provide for a large signal-to-noise ratio at the input of the integrator 50. Such large voltage does not appear at the output terminal of the integrator 50 because the output of the integrator 50 is in response to volt-seconds rather than volts.

It is also noted by way of comparison with other power supply systems not employing the invention, that if current sensing by a resistor, not employed in the invention, were to be inserted into the circuits of either the input or output windings of the transformer 26, these circuits would require a relatively high bandwidth for control of the output current. Control by means of volt-seconds, as is employed in the invention, can be accomplished with much less bandwidth. This reduced bandwidth reduces sensitivity to noise and permits responsivity to small signal levels. As a result, the turn-on and turn-off levels in the comparator function of the amplifier 72 are accomplished precisely with substantially no spurious signal components which might impair precise operation of the invention.

The following exemplary values are utilized in a power supply constructed in accordance with a preferred embodiment of the invention. The capacitors 54 of the storage unit 36 may be of differing values so as to include capacitors having both high frequency and low frequency response characteristics. The total value of the capacitance of the set of capacitors 54 is approximately 0.1 microfarads. The pulse forming network of the load 24 typically has values of L=60$\mu$ H and C=10$\mu$ F.

The input voltage V1 is assumed to be 28 volts DC. The voltages V2 and V4 each have a value of 15 volts DC, and the value of the V3 is 5 volts DC. The transistor 63 and 64 are each type 2N6676. The diode 66 is type 1N5811. The diode 68 is type 1N4988. Each of the diodes 42 is type 1N5418. The resistors 75, 76, 77, and 78 have values in kilohms of 4.99, 11.0, 4.99, and 4.12, respectively. The resistor 85 has a value of 100 ohms, and the resistor 86 has a value of 40 kilohms. The capacitor 82 has a value of 10 nanofarads. The turns ratio between the input winding 32 and any one section 40 of the output winding 34 is 1:2.5. The same turns ratio is provided between the sense winding 46 and one output winding section 40. The capacitor 44 has a value of 0.001 farads. The capacitors 106 and 108 each have a value of 0.1 microfarads. The resistors 101, 102, 103, and 104 have values of 10 megohms, 165 kilohms, 2 kilohms and 1 kilohms, respectively. The electronic switch 88 typically is an FET analog switch.

It is to be understood that the above-described embodiment of the invention are illustrative only, and that modifications thereof may occur to those skilled in the art. Accordingly, this invention is not to be regarded as limited to the embodiment disclosed herein, but is to be limited only as defined by the appended claims.

We claim:

1. A power supply with volt-seconds sensing for sensing transformer currents therein comprising:
   an input power source, an output circuit, and a volt-seconds sensing means;
   a transformer having an input winding, an output winding, and a sense winding coupled respectively to said input power source, said output circuit and said sensing means for coupling power from said power source to said output circuit;
   power switch means operated by said sensing means for switching current from said power source to said input winding; and wherein
   said sensing means comprises an integrator for integrating a voltage appearing at said sense winding, and a comparator coupled between said integrator and said switch means, said comparator driving said switch means into states of conduction and nonconduction dependent on the magnitude of an output signal of said integrator, thereby regulating the amount of currents in said transformer input and output windings.

2. A power supply according to claim 1 wherein said output circuit includes at least one diode serially connected to said output winding of said transformer, said transformer being a flyback transformer, said diode providing unidirectional flow to current in said output winding.

3. A power supply according to claim 1 wherein said power switch means comprises a transistor serially connected between a terminal of said input winding and a current-return terminal of said power source.

4. A power supply according to claim 1 wherein a core of said transformer is non-saturating during operation of said supply.

5. A power supply with volt-seconds sensing for sensing transformer currents therein comprising:
   an input power source comprising a bank of capacitors for storing electric energy, an output circuit, and a volt-seconds sensing means;
   a transformer having an input winding, an output winding, and a sense winding coupled respectively to said input power source, said output circuit and said sensing means for coupling power from said power source to said output circuit;
   power switch means operated by said sensing means for switching current from said power source to said input winding; and wherein
   said sensing means comprises an integrator for integrating a voltage appearing at said sense winding, and a comparator coupled between said integrator and said switch means, said comparator driving said switch means into states of conduction and nonconduction dependent on the magnitude of an output signal of said integrator, thereby regulating the amount of currents in said transformer input and output windings.

6. A power supply with volt-seconds sensing for sensing transformer currents therein comprising:
   an input power source, an output circuit, and a volt-seconds sensing means;
   a transformer having an input winding, an output winding, and a sense winding coupled respectively to said input power source, said output circuit and said sensing means for coupling power from said power source to said output circuit;
   power switch means comprising a field effect transistor serially connected between a terminal of said input winding and a current-return terminal of said power source and operated by said sensing means for switching current from said power source to said input winding; and wherein
   said sensing means comprises an integrator for integrating a voltage appearing at said sense winding, and a comparator coupled between said integrator and said switch means, said comparator driving said switch means into states of conduction and nonconduction dependent on the magnitude of an output signal of said integrator, thereby regulating the amount of currents in said transformer input and output windings.

7. A power supply with volt-seconds sensing for sensing transformer currents therein comprising:
   an input power source, an output circuit, and a volt-seconds sensing means;
   a transformer having an input winding, an output winding, and a sense winding coupled respectively to said input power source, said output circuit and said sensing means for coupling power from said power source to said output circuit;

power switch means operated by said sensing means for switching current from said power source to said input winding; and wherein said sensing means comprises an integrator comprising a resistor-capacitor circuit and means for discharging said capacitor, for integrating a voltage appearing at said sense winding, and a comparator coupled between said integrator and said switch means, said comparator driving said switch means into states of conduction and nonconduction dependent on the magnitude of an output signal of said integrator, thereby regulating the amount of currents in said transformer input and output windings.

8. A power supply according to claim 7 further comprising a voltage sensing circuit including a sensor of an output voltage of said output circuit, said voltage sensing circuit producing a signal for deactivating said power switch means and for operating said capacitor discharging means.

9. A power supply according to claim 8 wherein said logic circuitry includes means responsive to an enable signal for activating said power supply.

10. A power supply according to claim 9 wherein said output circuit includes a diode serially connected to said output winding of said transformer, said transformer being a flyback transformer, said diode providing unidirectional flow to current in said output winding.

11. A power supply according to claim 10 wherein a core of said transformer is nonsaturating during operation of said supply.

12. A power supply comprising:

a transformer having a input winding for receiving current from a source of power, an output winding for applying current to a load, and a core magnetically linking said input winding and said output winding;

an integrator;

means magnetically coupled to said core for applying a voltage to said integrator in response to changes of magnetic flux in said core, said integrator integrating said voltage to provide a volt-seconds signal proportional to magnetic flux in said core;

means responsive to the magnitude of said volt-seconds signal for switching current from the power source for unidirectional flow of the current to said input winding; and means in circuit with said output winding for constraining current therein to unidirectional flow, the current in said output winding flowing after termination of the current in said input winding by flyback operation of said transformer; and wherein said flux is proportional alternately to current in said input and said output windings to permit initiation and termination of the current in said input winding by said switching means in response to the magnitudes of the currents in said output and said input windings, respectively.

13. A power supply according to claim 12 further comprising means responsive to the magnitude of an output voltage applied by said output winding to the load for terminating operation of said switching means during intervals of output voltage which exceed a predetermined level.

14. A power supply according to claim 13 wherein said terminating means further terminates operation of said integrator during intervals of excessive output voltage of said output winding which exceed a predetermined level.

15. A power supply according to claim 12 wherein said voltage applying means is a sense winding of said transformer.

16. A power supply comprising:

a transformer having an input winding for receiving current from a source of power, an output winding for applying current to a load, and a core magnetically linking said input winding and said output winding;

an integrator;

means magnetically coupled to said core for applying a voltage to said integrator in response to changes of magnetic flux in said core, said integrator integrating said voltage to provide a volt-seconds signal proportional to magnetic flux in said core;

means responsive to the magnitude of said volt-seconds signal for switching current from the power source for unidirectional flow of the current to said input winding;

means in circuit with said output winding for constraining current therein to unidirectional flow, the current in said output winding flowing after termination of the current in said input winding by flyback operation of said transformer; and wherein said flux is proportional alternatively to current in said input and said output windings to permit initiation and termination of the current in said input winding by said switching means in response to the magnitudes of the currents in said output and said input windings, respectively; and an input circuit coupling said input winding to said power source, said switching means providing pulses of current to said input winding, and said input circuit including means for storing electric energy between the pulses of said input current.

* * * * *